US006148705A

United States Patent [19]

Shieh

[11] Patent Number: 6,148,705

[45] Date of Patent: Nov. 21, 2000

[54] TABLE SAW COMBINATION

[76] Inventor: Jin Shyan Shieh, No. 283, Fu An Road, Lin Yia Chu, Kaoshiung, 802, Taiwan

[21] Appl. No.: 09/323,377

[22] Filed: Jun. 1, 1999

[51] Int. Cl.[7] .......................................... B23D 19/00

[52] U.S. Cl. ....................... 83/435.27; 83/437.2; 83/953

[58] Field of Search ............................... 83/477.2, 508.2, 83/477.1, 662, 435.15, 435.27, 437.2, 953; 144/286.1, 286.5, 287

[56] References Cited

U.S. PATENT DOCUMENTS

| | | | |
|---|---|---|---|
| 3,344,819 | 10/1967 | Mitchell | 83/477.2 |
| 3,428,307 | 2/1969 | Hunter et al. | 108/83 |
| 4,292,870 | 10/1981 | Mericle | 83/477.2 |
| 4,546,804 | 10/1985 | Haeger | 144/286.1 |
| 4,566,510 | 1/1986 | Bartlett et al. | 83/477.2 |
| 4,757,849 | 7/1988 | Morris | 144/287 |
| 5,018,562 | 5/1991 | Adams | 144/253 |
| 5,201,863 | 4/1993 | Peot | 83/477.2 |
| 5,653,273 | 8/1997 | Bach | 144/286.1 |
| 5,927,857 | 7/1999 | Ceroll et al. | 83/477.2 |
| 5,937,924 | 8/1999 | Cooper | 83/477.1 |

FOREIGN PATENT DOCUMENTS

| | | | |
|---|---|---|---|
| 003044290A1 | 6/1982 | Germany | 144/286.1 |
| 002120165A | 11/1983 | United Kingdom | 144/286.1 |

*Primary Examiner*—Rinaldi I. Rada
*Assistant Examiner*—Omar Flores-Sańchez
*Attorney, Agent, or Firm*—Charles E. Baxley

[57] ABSTRACT

A table saw includes a base having one or more tracks secured on top. A seat is secured on one end of the tracks. A plate is slidably engaged on the tracks and detachably secured to the tracks. A saw device is secured to the bottom of the plate and includes a saw blade extended upward beyond the plate. A bar is secured on the seat, and a guide is selectively secured on the seat and the plate for guiding the work pieces to move across the saw blade. A board is slidably engaged on the seat and the plate for moving the work piece across the saw blade.

3 Claims, 4 Drawing Sheets

TABLE SAW COMBINATION

BACKGROUND OF THE INVENTION

1. Field of the Invention

The present invention relates to a table, and more particularly to a table saw combination.

2. Description of the Prior Art

Typical table saws comprise a table, and a saw secured in the middle portion of the table. A guide is secured on the side portion of the table for guiding the work piece to be moved through the saw. However, the saw is solidly secured in the table and may not be adjusted relative to the guide. In addition, the guide also includes a solid structure that may not be adjusted to guide the work pieces of different sizes through the saw.

The present invention has arisen to mitigate and/or obviate the afore-described disadvantages of the conventional table saws.

SUMMARY OF THE INVENTION

The primary objective of the present invention is to provide a table saw combination including a saw that may be adjusted relative to the table and including a number of guides for adjustably or for selectively adjusting the relative position between the saw and the guides and for guiding the work pieces of different sizes.

In accordance with one aspect of the invention, there is provided a table saw combination comprising a base including a track device provided thereon and having a first end and a second end and having a middle portion located between the first end and the second end of the track device, a seat secured on the first end of the track device and including a channel formed therein and perpendicular to the track device, a plate slidably engaged on the track device and adjustable and movable toward and away from the seat, the plate including a bottom portion, means for detachably securing the plate to the track device, a saw device secured to the bottom portion of the plate and including a saw blade extended upward beyond the plate. The saw device is secured to the plate and moved in concert with the plate for allowing the saw device to be adjusted relative to the seat.

The plate includes a frame device secured to the bottom portion thereof for slidably engaging with the track device, the frame device includes a bearing device engaged with the track device for facilitating a movement of the plate relative to the track device.

The plate includes a first groove formed therein and parallel to the seat, the table saw combination further comprises a bar engaged in the channel of the seat for engaging with and for guiding a work piece, and comprises a guide including a first side having a rib extended downward therefrom and engaged in the channel of the seat and including a second side to be supported on the plate.

A board includes a pair of flanges extended downward therefrom and slidably engaged in the channel of the seat and the first groove of the plate respectively for guiding the board to move along the first groove of the plate, the board includes a block secured thereon for engaging with and for guiding and for moving a work piece across the saw blade.

The plate includes a second groove formed therein, the table saw combination further includes a panel having a rib extended downward therefrom and engaged into the second groove of the plate and having a slot formed therein for receiving the saw blade and for allowing the saw blade to extend upward beyond the panel, the panel is flush with the board.

The seat includes at least one notch formed therein for engaging with the track device, the bar includes a recess formed therein for receiving the track device and for positioning the bar to the seat.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
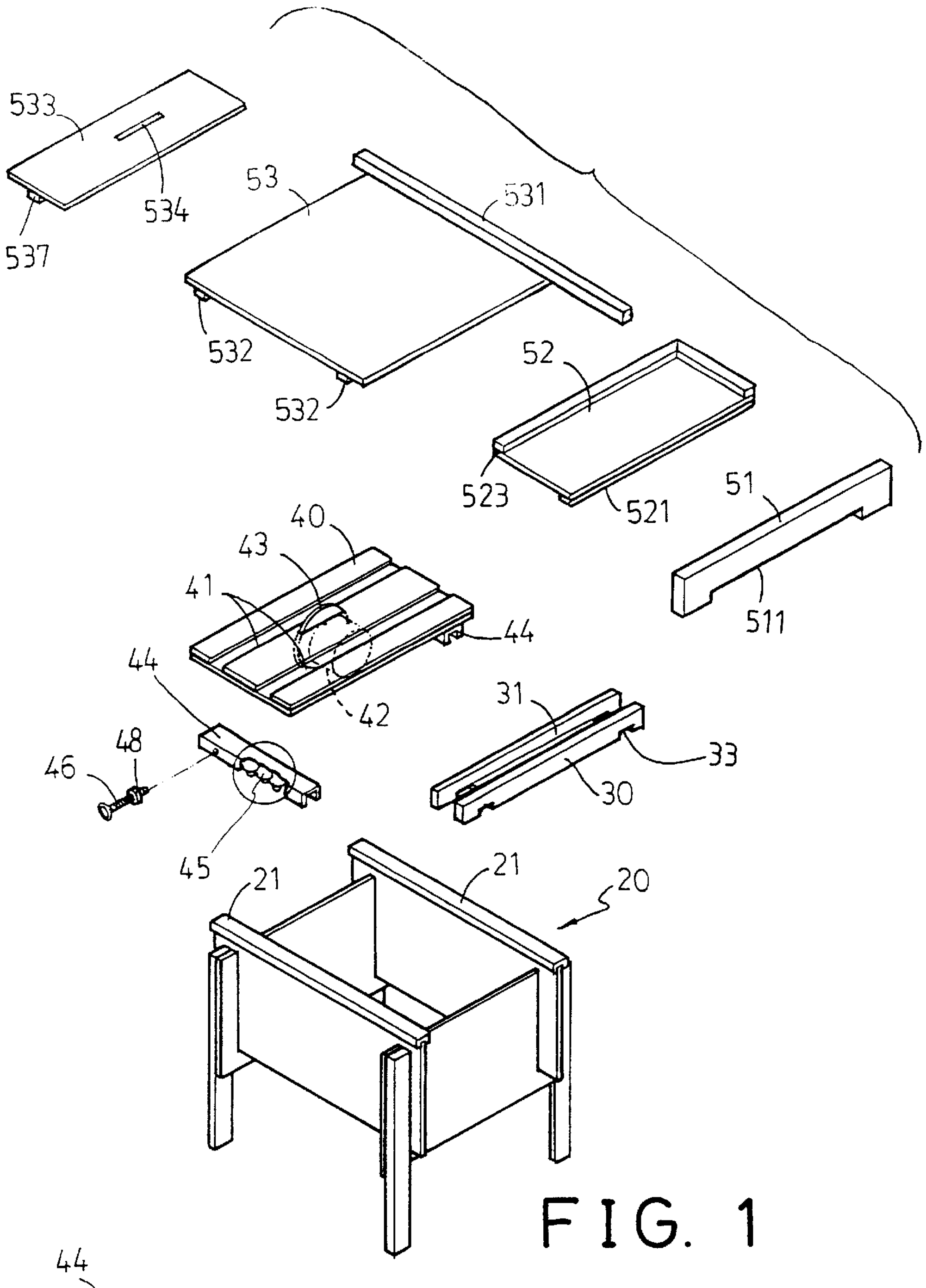
FIG. 1 is an exploded view of a table saw combination in accordance with the present invention.
Figure 2:
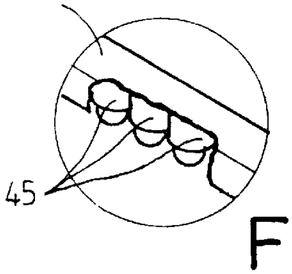
FIG. 2 is an enlarged partial perspective view of a frame of the plate.
Figure 3:
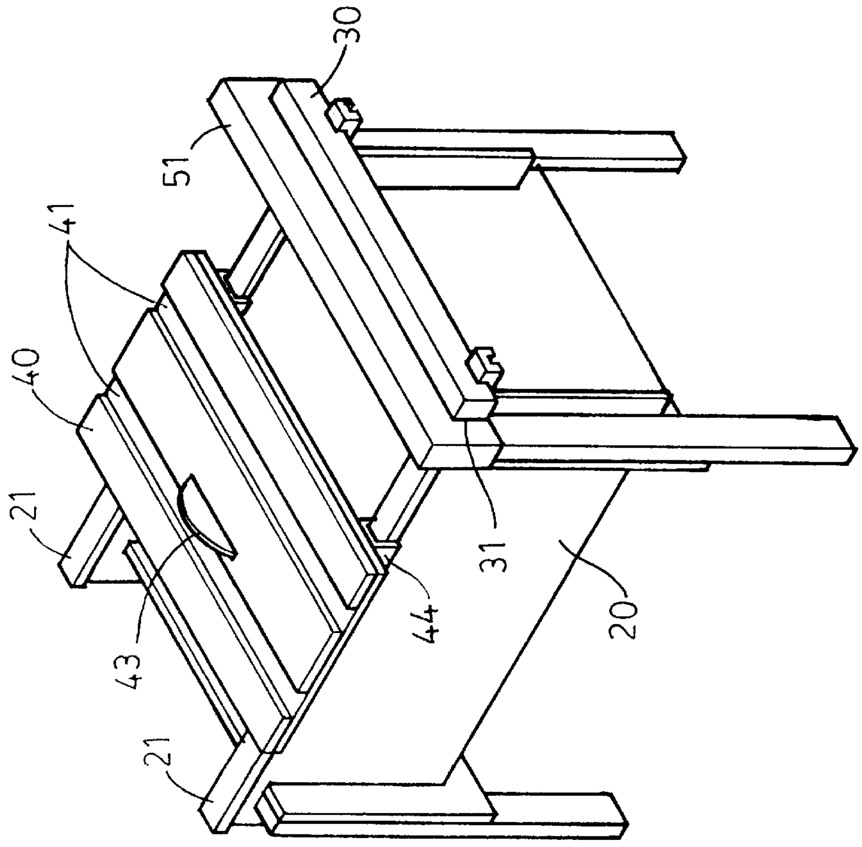

Referring to the drawings, and initially to FIGS. 1–3, a table saw combination in accordance with the present invention comprises a base 20 including a pair of tracks 21 disposed on top thereof and arranged in parallel to each other. A seat 30 is secured on one of the ends of the tracks 21 by such as fasteners or adhesive materials, and includes two notches 33 formed in the bottom for receiving the tracks 21, and includes a longitudinal channel 31 formed therein. The seat 30 and the longitudinal channel 31 are perpendicular to the tracks 21 of the base 20.

A plate 40 includes two frames 44 secured to the bottom and each having one or more roller bearings 45 secured therein for engaging with the tracks 21 and for allowing the plate 40 to be smoothly moved along the tracks 21 from the ends of the tracks 21 distal to the seat 30 toward the seat 30 and to be moved toward and away from the seat 30. One or more fasteners 46 are threaded through one or both of the frames 44 and engaged with the tracks 21 for securing the frames 44 and the plate 40 to the tracks 21 of the base 20. One or more nuts 48 may further be engaged on the fasteners 46 for further locking the fasteners 46 to the frames 44 respectively. The plate 40 includes one or more grooves 41 formed therein and parallel to the seat 30 and perpendicular to the tracks 21. A saw device 42 is secured to the bottom of the plate 40 and includes a saw blade 43 partially extended upward beyond the plate 40 and parallel to the grooves 41 and the seat 30.

Figure 6:
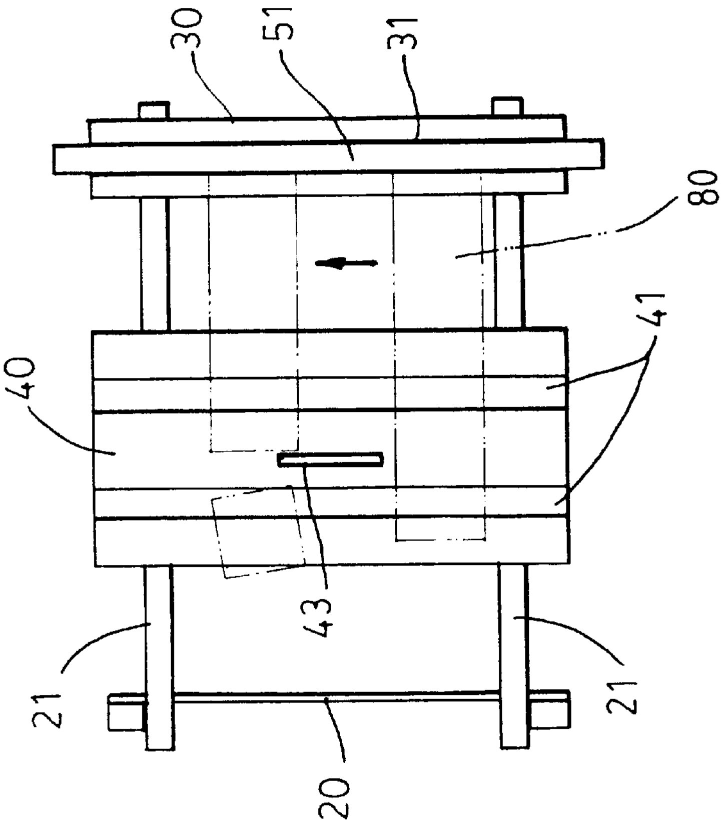

A bar 51 has a lower portion engaged into the channel 31 of the seat 30 (FIGS. 3, 6) and has a recess 511 formed in the bottom for receiving and for engaging with the tracks 21 and for preventing the bar 51 from moving relative to the seat 30. The bar 51 is not necessarily be secured to the seat 30 with the other fasteners or with the adhesive materials. The bar 51 may be retained in place with its own weight and with the engagement of the tracks 21 in the recess 511 of the bar 51. As shown in FIG. 6, the work piece 80 may be engaged with and moved along the bar 51 by the user and may be moved through the saw blade 43 so as to be cut by the saw blade 43.

Figure 4:
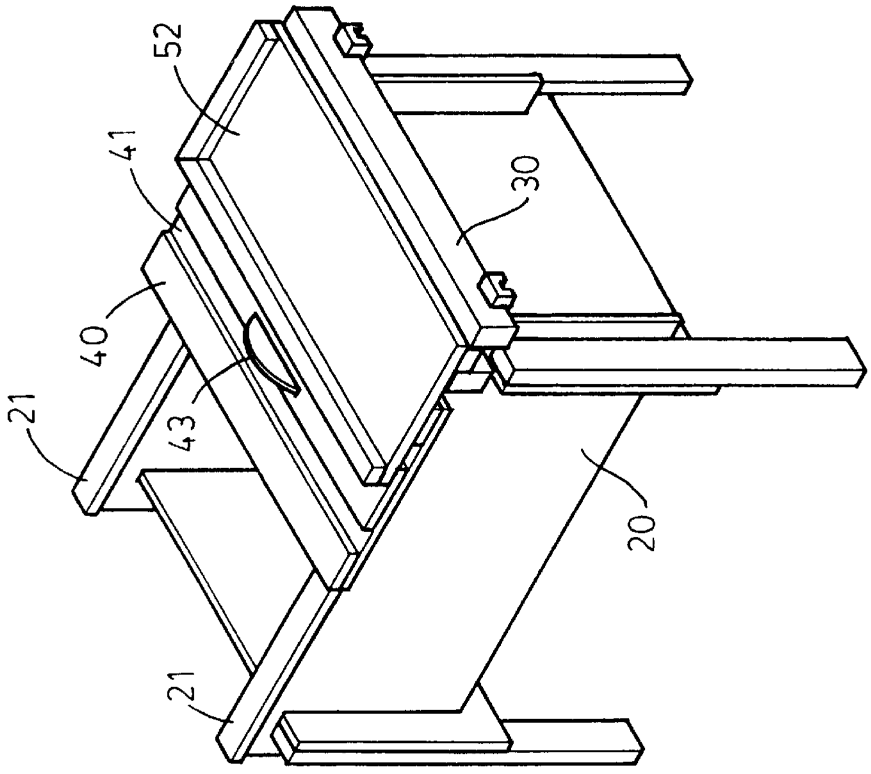
FIGS. 3, 4, 5 are perspective views illustrating the application of the table saw combination.
Figure 7:
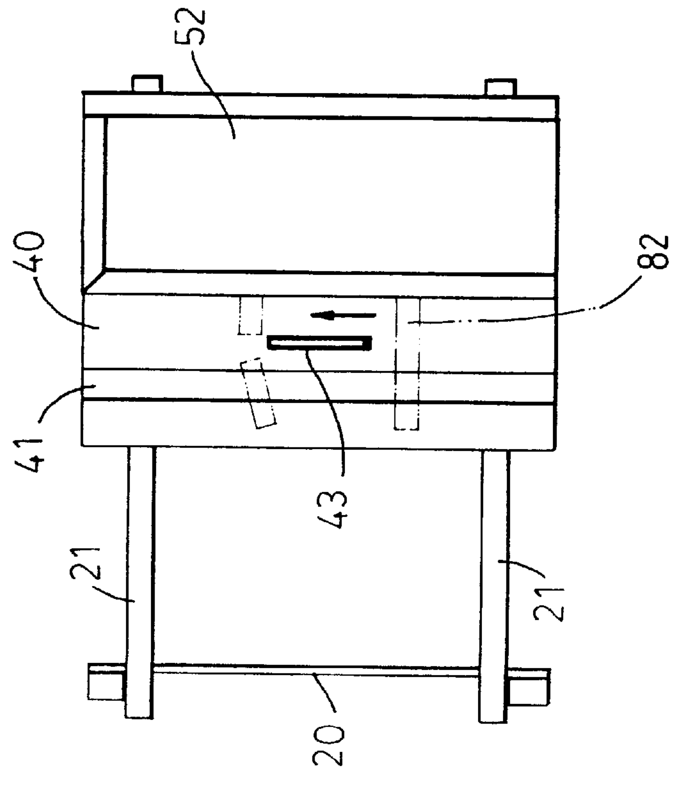

A guide 52 includes a rib 521 extended downward from one side thereof for engaging into the channel 31 of the seat 30 (FIGS. 4, 7) and includes the other side 523 to be supported on the plate 40. The guide 52 may further include a rib extended downward therefrom and engaged with one of the grooves 41 of the plate 40. As shown in FIG. 7, the work piece 82 may engaged with and moved along the guide 52 by the user and may be moved through the saw blade 43 so as to be cut by the saw blade 43. The guide 52 is not required to be moved relative to the seat 30 and the plate 40, and the engagement of a single rib 521 with the channel 31 of the seat 30 is good enough to secure the guide 52 to the seat 30. It is preferable that the guide 52 further includes a projection or a hook or a latch or the like to engage with the seat 30 or the plate 40 or the tracks 21 for further positioning the guide 52 to the seat 30 or the plate 40.

Figure 5:
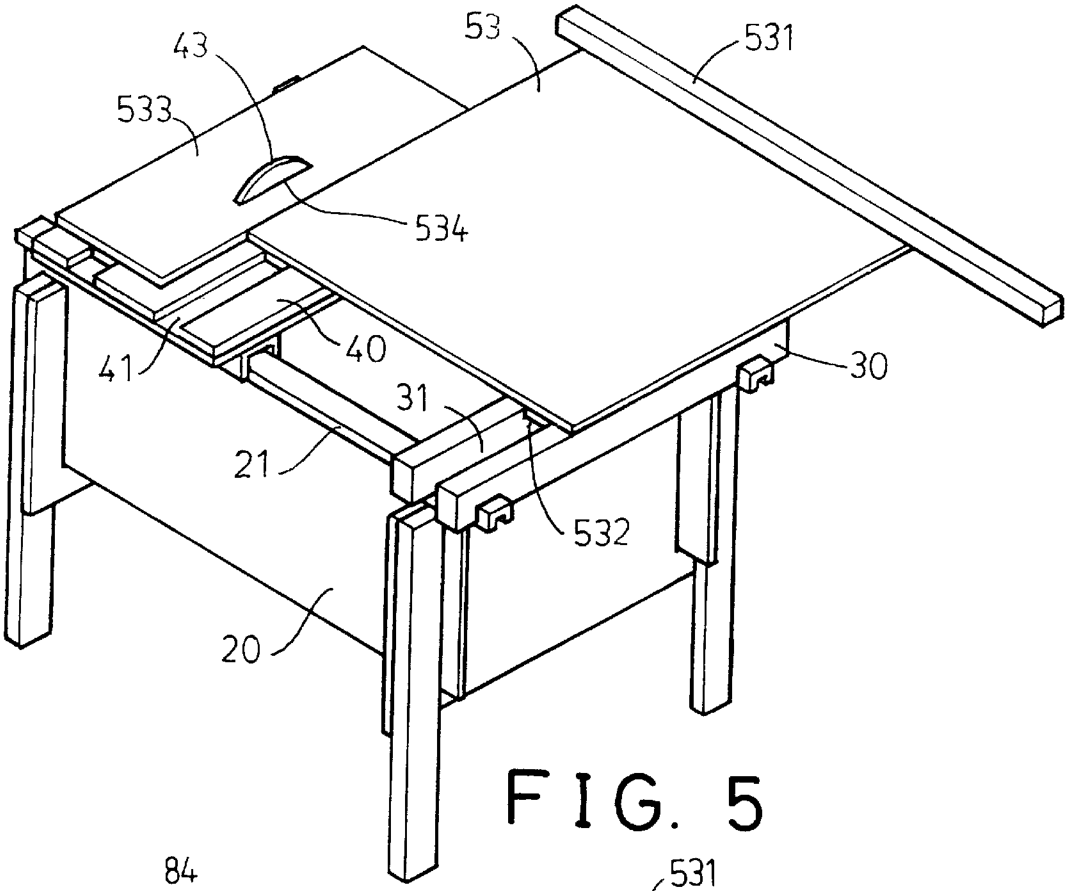
Figure 8:
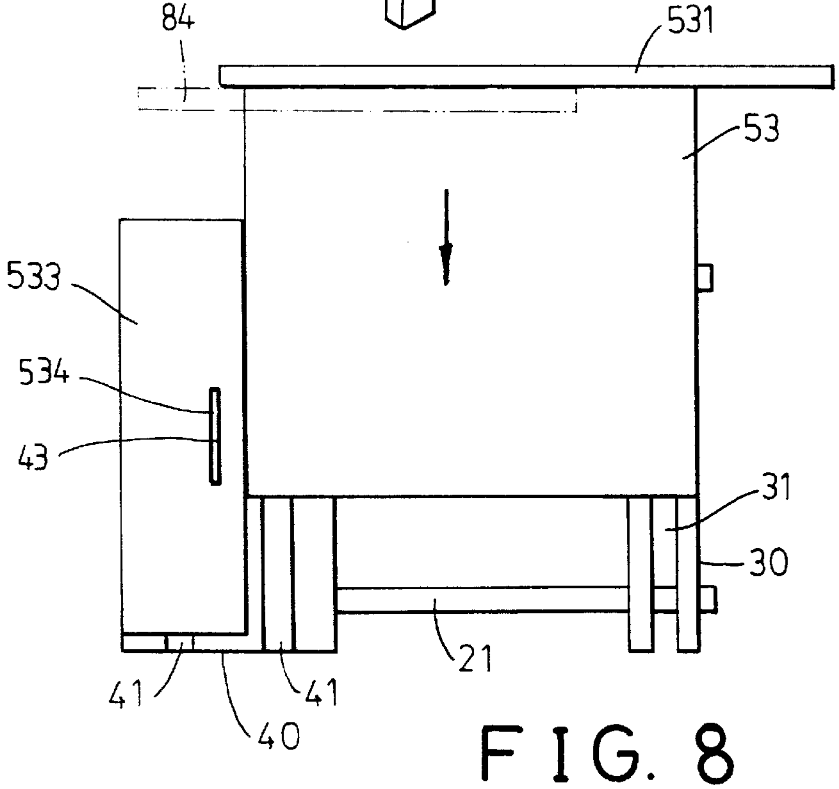
FIGS. 6, 7, 8 are top plane views of the table saw combination as shown in FIGS. 3, 4, 5 respectively.

A board 53 includes a pair of flanges 532 extended downward therefrom and slidably engaging in the channel 31 of the seat 30 and one of the grooves 41 of the plate 40 (FIGS. 5, 8) for allowing the board 53 to be moved in a direction parallel to the grooves 41 of the plate 40 and to the seat 30. The board 53 includes a block 531 secured thereon for engaging with the work piece 84 (FIG. 8) and for stably moving the work piece 84 across the saw blade 43. A panel 533 may further be provided and engaged on the plate 40 and includes a slot 534 formed therein for receiving the saw blade 43 and includes a rib 537 extended downward therefrom for engaging with the other groove 41 of the plate 40. The panel 533 is flush with the board 53 for allowing the work piece 84 to be stably moved across the saw blade 43.

In operation, either the bar 51 or the guide 52 may be selectively secured to the seat 30 for engaging with and for guiding the work pieces 80, 82 to be moved across the saw blade 43. Alternatively, the board 53 may be slidably engaged on the seat 30 and the plate 40 for moving the work piece 84 across the saw blade 43.

Accordingly, the table saw combination in accordance with the present invention includes a saw that may be adjusted relative to the table and including a number of guides for adjustably or for selectively adjusting the relative position between the saw and the guides and for guiding the work pieces of different sizes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A table saw combination comprising:

a base including a track device provided thereon and having a first end, a seat secured on said first end of said track device and including a channel formed therein and perpendicular to said track device, a plate slidably engaged on said track device and adjustable and movable toward and away from said seat, said plate including a bottom portion and including a first groove formed therein and parallel to said seat and including a second groove formed therein, means for detachably securing said plate to said track device, a saw device secured to said bottom portion of said plate and including a saw blade extended upward beyond said plate, a bar engaged in said channel of said seat for engaging with and for guiding a work piece, a guide including a first side having a rib extended downward therefrom and engaged in said channel of said seat when said bar is disengaged from said channel of said seat, said guide including a second side to be supported on said plate, a board including a pair of flanges extended downward therefrom and slidably engaged in said channel of said seat and said first groove of said plate respectively when said guide and said bar are disengaged from said channel of said seat, for guiding said board to move along said first groove of said plate, said board including a block secured thereon for engaging with and for guiding and for moving the work piece across said saw blade, a panel having a rib extended downward therefrom and engaged into said second groove of said plate and having a slot formed therein for receiving said saw blade and for allowing said saw blade to extend upward beyond said panel, said panel being flush with said board, said saw device being secured to said plate and moved in concert with said plate for allowing said saw device to be adjusted relative to said seat.

2. The table saw combination according to claim 1, wherein said detachably securing means includes a frame device secured to said bottom portion of said plate for slidably engaging with said track device, said frame device includes a bearing device engaged with said track device for facilitating a movement of said plate relative to said track device.

3. The table saw combination according to claim 1, wherein said seat includes at least one notch formed therein for engaging with said track device, said bar includes a recess formed therein for receiving said track device and for positioning said bar to said seat.

* * * * *